US010656633B2

(12) United States Patent
Ferry et al.

(10) Patent No.: US 10,656,633 B2
(45) Date of Patent: May 19, 2020

(54) METHOD FOR MANUFACTURING PARTS BASED ON ANALYSIS OF WEIGHTED STATISTICAL INDICATORS (71) Applicant: Safran Aircraft Engines, Paris (FR)

(72) Inventors: Olivier Ferry, Moissy-Cramayel (FR); Arnaud Cambefort, Moissy-Cramayel (FR); Pascal Courtin, Moissy-Cramayel (FR); Nicolas Hardouin, Moissy-Cramayel (FR); Charles Cleret De Langavant, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 410 days.

(21) Appl. No.: 15/532,483

(22) PCT Filed: Dec. 4, 2015

(86) PCT No.: PCT/FR2015/053323
§ 371 (c)(1),
(2) Date: Jun. 1, 2017

(87) PCT Pub. No.: WO2016/087796
PCT Pub. Date: Jun. 9, 2016

(65) Prior Publication Data
US 2018/0267521 A1    Sep. 20, 2018

(30) Foreign Application Priority Data
Dec. 5, 2014 (FR) ...................... 14 61991

(51) Int. Cl.
*G05B 19/418* (2006.01)
*G06Q 50/04* (2012.01)
*G06Q 10/06* (2012.01)

(52) U.S. Cl.
CPC . *G05B 19/41875* (2013.01); *G06Q 10/06395* (2013.01); *G06Q 50/04* (2013.01);
(Continued)

(58) Field of Classification Search
None
See application file for complete search history.

(56) References Cited

U.S. PATENT DOCUMENTS

| | | | |
|---|---|---|---|
| 5,655,110 A | 8/1997 | Krivokapic et al. | |
| 2005/0171626 A1* | 8/2005 | Schwarm | ........... G05B 23/0294 700/108 |

OTHER PUBLICATIONS

International Search Report in PCT/FR2015/053323 dated Feb. 11, 2016, with English translation.
(Continued)

*Primary Examiner* — Roy Y Yi
*Assistant Examiner* — Geoffrey T Evans
(74) *Attorney, Agent, or Firm* — Womble Bond Dickinson (US) LLP (57) ABSTRACT

The invention pertains to a method of manufacturing parts produced with a manufacturing device, based on the analysis of at least one statistical indicator representative of a characteristic dimension of the parts, according to which: a) in the course of time several samples are collected, each sample comprising several parts produced with the manufacturing device; b) the characteristic dimension of each part of the sample is measured; c) for each sample collected a weighted mean and a weighted standard deviation of the characteristic dimension are calculated according to an exponential weighting on the basis of a mean and standard deviation of the characteristic dimensions measured on the parts of said sample, of weighted means and of weighted standard deviations of the characteristic dimension which are calculated for previously collected samples; d) for each sample collected a value of the statistical indicator is cal-
(Continued)

culated on the basis of the weighted mean and of the weighted standard deviation thus calculated; e) a value of the statistical indicator thus calculated for the sample collected is compared with a reference value to detect a possible deviation; f) the manufacture of the parts is steered as a function of the results of the comparison by fitting the manufacturing device adjustment parameters to optimize the deviation between the value of the statistical indicator and the reference value.

12 Claims, 2 Drawing Sheets

(52) U.S. Cl.
CPC .............. *G05B 2219/32191* (2013.01); *G05B 2219/32201* (2013.01); *Y02P 90/30* (2015.11)

(56) References Cited

OTHER PUBLICATIONS

Search Report in French Application No. 1461991 dated Jun. 8, 2015, with English translation coversheet.

\* cited by examiner

Fig. 1

METHOD FOR MANUFACTURING PARTS BASED ON ANALYSIS OF WEIGHTED STATISTICAL INDICATORS

FIELD OF THE INVENTION

The invention relates to the use of statistical indicators in an industrial setting, for example, in the aeronautics industry, in particular for facilitating monitoring and control of the manufacturing of parts.

PRIOR ART

The manufacture of parts, especially mechanical parts, in an industrial setting is met with two opposing constraints: specifically, the increase in manufacturing throughput and volumes on the one hand, and the increased quality requisites on the other, which is particularly true in the aeronautical field.

Today it is difficult to imagine performing quality control on all parts manufactured except to considerably impair manufacturing throughput. Statistical manufacturing indicators are therefore generally used, reliably deducing overall information on the quality of the set of parts manufactured from specific information on the quality of a finite number of parts taken as samples.

Apart from controls at the end of production, which can be done on samples having a limited number of parts, checks are generally also made during production to be able to optionally regulate production flow, that is, adjust manufacturing conditions to ensure that the parts made continue to respond to the required quality criteria. In some cases, these statistical controls during production can result in production stopping completely, especially if the parts produced present excessive quality defects and the manufacturing flow must be completely reinitialised.

Quality controls are performed in relation to a characteristic dimension of the parts that are manufactured. This characteristic dimension can be, for example, a particular side of the part, its mass, or any other measurable characteristic of said parts.

To perform statistical controls, several samples are taken successively, each sample comprising several parts of the manufacturing flow, and the characteristic dimensions of each part of the sample taken are then measured. The value of a statistical indicator selected previously to monitor the quality of the manufacturing flow is calculated from the different measurements of the characteristic dimension of the parts of the sample taken.

There are various statistical indicators, which can be used to monitor the evolution of a manufacturing flow of parts, each statistical indicator giving different information for adjusting the manufacturing conditions in one way or another.

Most statistical indicators used for monitoring an industrial manufacturing process are calculated from an average μ and a standard deviation σ of the measured characteristic dimension on several parts. More precisely, μ corresponds to the average of the decentring measured for the characteristic dimension relative to the reference value for this characteristic dimension.

An example is the centring coefficient, noted Cc, which shows restraint imposed on the variations of the average μ inside the tolerance interval IT. The tolerance interval IT is the deviation between the extreme admissible values of the characteristic dimension, therefore being calculated as the difference between the greater tolerance TS and the lesser tolerance TI of the measured characteristic dimension, or IT=TS−TI. The centring coefficient Cc is generally defined by the formula:

$$Cc = \frac{\mu}{(TS - TI)/2}$$

The manufacturing process can also be regulated by studying capability indices which characterise the real performance of the process relative to the preferred performance. Such indices in fact measure the capacity of the manufacturing process to make parts whereof the characteristic dimensions are included in the preferred tolerance interval IT.

Reference can be made for example to the process capability index Cp which represents the aptitude of a manufacturing process to produce parts precisely and repeatably. The larger the capability index Cp the more the parts made will be similar, whereas if the capability index Cp is low, the production will be dispersed. The process capability index Cp is defined generally by the formula:

$$Cp = \frac{(TS - TI)/2}{3\sigma}$$

The disadvantage of such a process capability index Cp is that a positive result (that is, high) can also correspond to production outside the limits of tolerance. In fact, the industrial conformity of a manufacturing flow depends on scope, that is not only its dispersion but also the position of its average relative to the tolerance interval IT. Another capability index used is therefore the capability index Cpk, which shows dispersion but also the centring of the production relative to the limits of tolerance. In this case, when the capability index Cpk is high, this means that production can be repeated and that it is also centred in the tolerance interval IT, that is, there will be less risk that parts are manufactured outside tolerances. The process capability index Cpk is defined generally by the formula:

$$Cpk = \frac{\text{Min}(TS - \mu; \mu - TI)}{3\sigma}$$

There are of course other statistical indicators having specific properties, and, which can be used as a function of the needs to regulate the manufacturing process.

For reliable monitoring and regulating of the manufacturing process using such statistical indicators, these indicators are generally monitored on two time scales.

In fact, this can be based on a long-term scale defined with a minimum number of parts (in general at least 250 parts per sampling), on which it is possible to calculate statistical indicators such as the Cpk with a sufficiently good confidence interval to accord them a certain credibility.

This can also be based on a short-term scale which is defined as such relative to a time interval after which a sample is taken (generally each week); this enables a prompter reaction in case of rapid excess of production.

These methods of production monitoring are not satisfactory however when the manufacturing flow of parts is not substantial enough, that is, when the number of parts of the sample taken is too small and/or very different between two successive samplings.

For example, the production of turbine blades is often highly variable, where the sizes of samples can be extremely different from one week to the next (from 8 to 300 parts per period).

An aim of the present invention is to propose a manufacturing method of parts based on analysis of at least one effective statistical indicator for monitoring random production, with a number of variable parts to be sampled, and/or with small numbers of parts.

Another aim of the present invention is to propose a manufacturing method for parts based on analysis of at least one statistical indicator which is reactive to substantial variations in the manufacturing flow, and is sufficiently stabilised so as not to react to the least insignificant production deviation, also enabling overall vision of the manufacturing flow.

SUMMARY OF THE INVENTION

For this purpose, a method for manufacturing parts is proposed, based on analysis of at least one statistical indicator representative of a characteristic dimension of parts, according to which:
a) several samples are taken over time, each sample comprising several parts made by a manufacturing device;
b) the characteristic dimension of each part of the sample as taken is measured;
c) a weighted average and a weighted standard deviation of the characteristic dimension according to an exponential weighting are calculated for each sample taken from
  an average and a standard deviation of characteristic dimensions measured on the parts of said sample taken,
  weighted averages and weighted standard deviations of the characteristic dimension calculated for samples taken previously;
d) a value of the statistical indicator from the weighted average and the weighted standard deviation calculated in this way are calculated for each sample taken;
e) the value of the statistical indicator calculated in this way for the sample taken is compared to a reference value, which detects for example any standard deviation between the value of the statistical indicator and the reference value;
f) the manufacturing of parts is regulated as a function of the results of comparison, preferably by adjusting regulating parameters of the manufacturing device used to make the parts in order to optimise a deviation between the value of the statistical indicator and the reference value.

Each of the steps presented is preferably automated.

The measuring step of the characteristic dimension can be conducted with a measuring device, for example comprising sensors for performing automated measuring of specific dimensions of the part.

The calculation steps can be taken by any appropriate calculation device, such as for example processing computer data means, such as a computer.

The regulating step can be taken for example by a regulating device integrating processing means for integrating and processing data originating from the calculation steps in order to correct any deviation detected in production and correct production flow. In particular, the regulating device is provided to correct the input parameters of the production device from which parts originated.

The regulating device therefore preferably adjusts the regulating parameters of the manufacturing device used to make the parts for example in order to reduce the deviation between the value of the statistical indicator and the reference value More generally, the aim is to optimise the deviation between the value of the statistical indicator and the reference value so that production of parts complies with requirements of the relevant specification. The production parameters are modified for modifying, or respectively correcting, the deviation identified between the value of the statistical indicator and the reference value. As a function of the statistical indicator used, optimising the deviation could for example consist of reducing the deviation identified.

Preferred, though non-limiting, aspects of this method, taken singly or in combination, are the following:
  the number of parts contained in each sample taken is not constant, and in order to calculate for each sample taken at a period t+1 a weighted average and a weighted standard deviation of the characteristic dimension, a number of aggregated parts $N_{t+1}$ is defined according to the formula:

$$N_{t+1} = \lambda n_{t+1} + (1-\lambda) N_t$$

where:
    $n_{t+1}$ is the number of parts contained in the sample taken at the period t+1;
    $N_t$ is the number of aggregated parts of the sample at the period t;
    $\lambda$ is a weighting coefficient between 0 and 1.
  the number of parts contained in each sample taken is not constant, and where in order to calculate for each sample taken at a period t+1 a weighted average and a weighted standard deviation of the characteristic dimension, a number of aggregated parts $N_{t+1}$ is defined according to the formula:

$$N_{t+1} = k\lambda n_{t+1} + (1-\lambda) N_t$$

where:
    $n_{t+1}$ is the number of parts contained in the sample taken at the period t+1;
    $N_t$ is the number of aggregated parts of the sample at the period t;
    $\lambda$ is a weighting coefficient between 0 and 1;
    k is a coefficient of aggregation determined strictly greater than 1.
  for each sample taken at a period t+1 a weighted average $M_{t+1}$ and a weighted standard deviation $S_{t+1}$ of the characteristic dimension are calculated according to the formulas:

$$M_{t+1} = \lambda \mu_{t+1} + (1-\lambda) M_t$$

$$S_{t+1} = \sqrt{\lambda \sigma_{t+1}^2 + (1-\lambda) S_t^2 + \lambda(1-\lambda)(\mu_{t+1} - M_t)^2}$$

where:
    $\mu_{t+1}$ is the average of characteristic dimensions measured on the parts of the sample taken at the period t+1;
    $M_t$ is the weighted average of the characteristic dimension calculated for the period t;
    $\sigma_{t+1}$ is the standard deviation of characteristic dimensions measured on the parts of the sample taken at the period t+1;
    $S_t$ is the weighted standard deviation of the characteristic dimension calculated for the period t;
    $\lambda$ is a weighting coefficient between 0 and 1.

for each sample taken at a period t+1 a weighted average $M_{t+1}$ and a weighted standard deviation $S_{t+1}$ of the characteristic dimension are calculated according to the formulas:

$$M_{t+1} = \lambda^* \mu_{t+1} + (1-\lambda) M_t$$

$$S_{t+1} = \sqrt{\lambda^* \sigma_{t+1}^2 + (1-\lambda) S_t^2 + \lambda^*(1-\lambda)(\mu_{t+1} - M_t)^2}$$

where:
- $\mu_{t+1}$ is the average of characteristic dimensions measured on the parts of the sample taken at the period t+1;
- $M_t$ is the weighted average of the characteristic dimension calculated for the period t;
- $\sigma_{t+1}$ is the standard deviation of characteristic dimensions measured on the parts of the sample taken at the period t+1;
- $S_t$ is the weighted standard deviation of the characteristic dimension calculated for the period t;
- $\lambda$ is a weighting coefficient between 0 and 1;
- $\lambda^*$ is an intermediate weighting coefficient defined by the formula:

$$\lambda^* = \frac{k\lambda n_{t+1}}{k\lambda n_{t+1} + (1-\lambda) N_t}$$

the at least one statistical indicator is a capability index and/or a centring coefficient.

a capability index Cpk calculated according to the formula is selected as statistical indicator:

$$Cpk = \frac{\text{Min}(TS - M_{t+1}; M_{t+1} - TI)}{3 S_{t+1}}$$

where:
- $M_{t+1}$ is the weighted average and $S_{t+1}$ the weighted standard deviation of the characteristic dimension of a sample at a period t+1;
- TS is an upper tolerance of the measured characteristic dimension;
- TI is a lower tolerance of the measured characteristic dimension.

a capability index Cp calculated according to the formula is selected as statistical indicator:

$$Cp = \frac{(TS - TI)/2}{3 S_{t+1}}$$

where:
- $S_{t+1}$ is the weighted standard deviation of the characteristic dimension of a sample at a period t+1;
- TS is an upper tolerance of the measured characteristic dimension;
- TI is a lower tolerance of the measured characteristic dimension.

a capability index Cc calculated according to the formula is selected as statistical indicator:

$$Cc = \frac{M_{t+1}}{(TS - TI)/2}$$

where:
- $M_{t+1}$ is the weighted average of the characteristic dimension of a sample at a period t+1;
- TS is an upper tolerance of the measured characteristic dimension;
- TI is a lower tolerance of the measured characteristic dimension.

DESCRIPTION OF FIGURES

Other characteristics and advantages of the invention will emerge from the following description which is purely illustrative and nonlimiting and must be viewed with respect to the attached figures.

DETAILED DESCRIPTION OF THE INVENTION

To respond to the restrictions of variability in production, which impacts not only on the average of the measured characteristic dimension during sampling, but also on the standard deviation of these measurements, it is proposed to calculate for each sample taken a weighted average and a weighted standard deviation of the characteristic dimension according to exponential weighting.

This calculation is preferably based on the average and the standard deviation of characteristic dimensions measured on the parts of the sample taken, as well as on the weighted averages and the weighted standard deviations of the characteristic dimension which have been calculated for samples taken previously.

For weighting of the average for example, the monitored index is a weighted average of the decentring of production to be noted as $M_t$, and which is calculated at the period t+1 as follows, as a function of decentring data of the period t+1 noted $\mu_{t+1}$, and of the index calculated at the period t:

$$M_{t+1} = \lambda \mu_{t+1} + (1-\lambda) M_t$$

where $\lambda \in [0; 1]$ $\lambda \in [0; 1]$ is a weighting coefficient previously selected.

This corresponds to the mix of two populations of averages $\mu_{t+1}$ and $M_t$ in respective proportions $\lambda$ and $(1-\lambda)$.

The weighting is called exponential as developing the formula hereinabove gives:

$$M_{t+1} = \lambda \mu_{t+1} + \lambda(1-\lambda)\mu_t + \lambda(1-\lambda)^2 \mu_{t-1} + \lambda(1-\lambda)^3 \mu_{t-2} + \lambda(1-\lambda)^4 \mu_{t-3} + \ldots$$

Throughout the description, a value corresponding to a characteristic specifically linked to the sample taken at the period t is noted by a lowercase letter qualifying said characteristic followed by the index t. In contrast, a value of a characteristic which is not specifically linked to the sample taken at the period t but rather to all samples taken between the periods 0 and t is noted by an uppercase letter qualifying said characteristic followed by the index t.

So $\mu_t$ represents the average of decentring noted on the parts of the sample taken at the period t, whereas $M_t$ represents the average of weighted decentring and calculated from all the samples taken between the periods 0 and t.

In the same way as for the average an indicator $S_t$ of the standard deviation of a population can be constructed where a heavier weight is given to the last samples taken, and calculated as the standard deviation of the mix of two populations of standard deviations respective $\sigma_{t+1}$ (data of the period t+1) and $S_t$ (index of the period t) in respective proportions $\lambda$ and $(1-\lambda)$, as follows:

$$S_{t+1} = \sqrt{\lambda \sigma_{t+1}^2 + (1-\lambda)S_t^2 + \lambda(1-\lambda)(\mu_{t+1}-M_t)^2}$$

In reality, it is preferable to also consider variations of the size of samples.

A number of parts aggregated at the period t, noted $N_t$, can be defined and which is calculated recursively as a function of the size $n_{t+1}$ of the sample at time t+1.

A possible aggregation formula is the following:

$$N_{t+1} = \lambda n_{t+1} + (1-\lambda)N_t$$

This aggregation formula of the number of parts gives an unaccumulated average: the sum of the coefficients allocated to the different samples is 1.

If focus is placed on a simple sum of size of samplings over a given number of weeks k (k=5 for example in the event where the sample considered accumulates measurements of the last five samplings), the sum of the weightings allocated to the samples would be k (and of course without this nothing at all changes calculation of the corrected averages and standard deviations).

The challenge of this sum of weightings is in the calculation of intervals of confidence for the capability indices Cpk: if the corrected size of the sample is calculated using the formula $N_{t+1} = \lambda n_{t+1} + (1-\lambda)N_t$ with sampling sizes equal to 10 of 30 consecutive samples, the corrected size of the sample will always be 10, and the confidence interval on the calculated capability indices Cpk would be enormous, whereas if the focus were the cumulative size of the last five samplings ($N_{t+1} = n_{t+1} + n_t + n_{t-1} + n_{t-2} + n_{t-3}$), the accumulated size of the sample would be permanently equal to 50, and the confidence interval on the capability indices Cpk would be much better.

So to further improve monitoring and regulating of the manufacturing flow, a partially cumulative formula will be used for calculating the corrected size of the sample, of the form:

$$N_{t+1} = k\lambda n_{t+1} + (1-\lambda)N_t$$

where k>1, and $\lambda \in [0; 1]$ are fixed at the start of the manufacturing method by the user as a function of his requirement in terms of reactivity and accumulated samplings.

If a simple mix of two samples were done relative to their respective sizes $n_1$ and $n_2$, the average and the standard deviation of the mixture would be calculated by the formulas:

$$\mu = \gamma\mu_1 + (1-\gamma)\mu_2$$

and $$\sigma = \sqrt{\gamma\sigma_1^2 + (1-\gamma)\sigma_2^2 + \gamma(1-\gamma)(\mu_1-\mu_2)^2}$$

with $$\gamma = \frac{n_1}{n_1 + n_2}.$$

The «virtual» population of size $N_{t+1} = k\lambda n_{t+1} + (1-\lambda)N_t$ is in exactly the same way a clustered population, constituted by the mix of two subpopulations of respective sizes $k\lambda n_{t+1}$ and $(1-\lambda)N_t$.

The proportion of parts recently controlled in the mixture, to be noted can therefore be defined according to the formula:

$$\lambda^* = \frac{k\lambda n_{t+1}}{k\lambda n_{t+1} + (1-\lambda)N_t}$$

As per another embodiment, the weighted average $M_{t+1}$ and the weighted standard deviation $S_{t+1}$ can be calculated by the formulas:

$$M_{t+1} = \lambda^* \mu_{t+1} + (1-\lambda^*)M_t$$

and $$S_{t+1} = \sqrt{\lambda^* \sigma_{t+1}^2 + (1-\lambda^*)S_t^2 + \lambda^*(1-\lambda^*)(\mu_{t+1}-M_t)^2}$$

Monitoring and regulating of manufacturing flows of parts is then done by using the usual statistical indicators based on an average and a standard deviation of the characteristic dimension measured on the parts of the sample, by substituting the weighted average $M_{t+1}$ for the average $\mu$, and the weighted standard deviation $S_{t+1}$ for the standard deviation in the formulas which define these statistical indicators.

Thus for example, the capability index Cpk will be calculated according to the formula:

$$Cpk = \frac{\text{Min}(TS - M_{t+1}; M_{t+1} - TI)}{3S_{t+1}}$$

The capability index Cp will be calculated according to the formula:

$$Cp = \frac{(TS - TI)/2}{3S_{t+1}}$$

The centring coefficient Cc will be calculated according to the formula:

$$Cc = \frac{M_{t+1}}{(TS - TI)/2}$$

Figure 1:
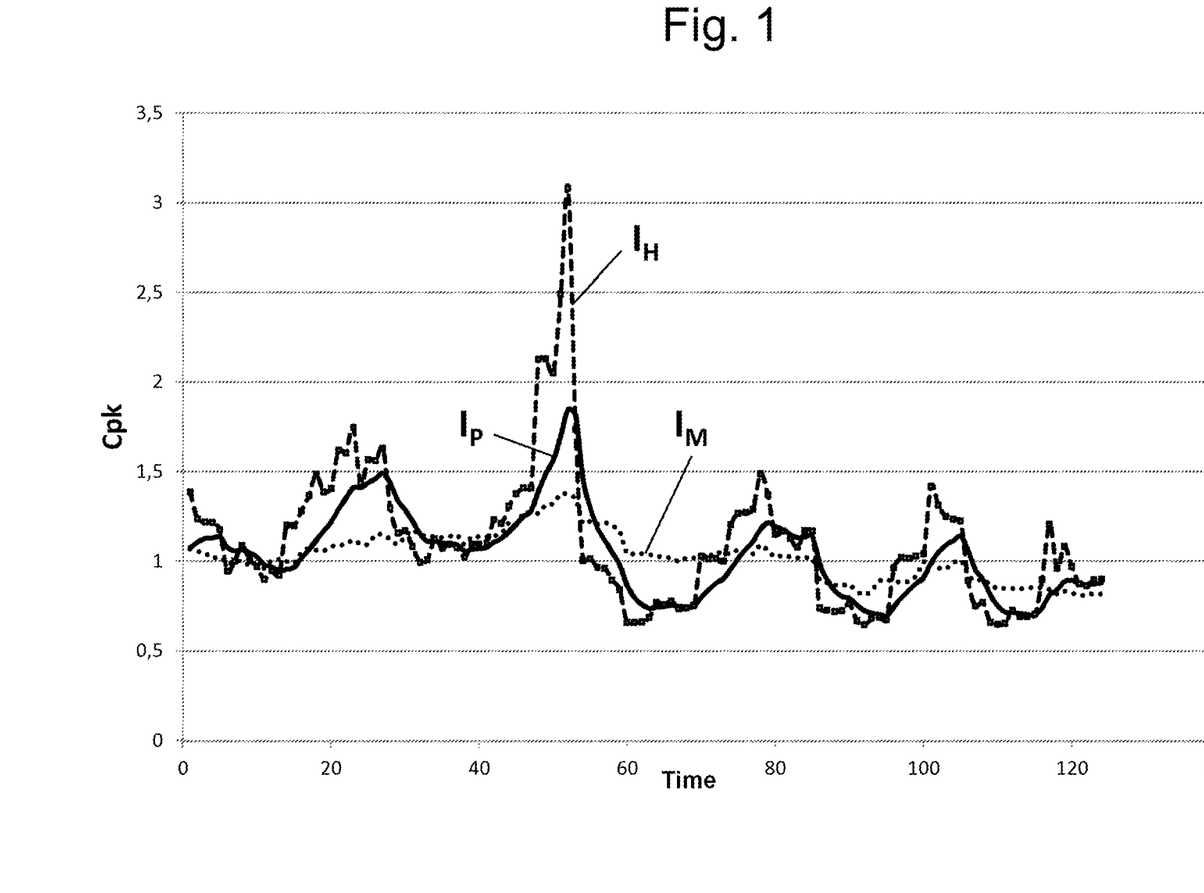
FIG. 1 is a graphic illustrating the evolution of the capability index Cpk over time for several sampling types.

The example described below for FIG. 1 illustrates the considerable advantages brought by the weighted indicators calculated from values $M_{t+1}$ and $S_{t+1}$ on the basis of random drawing.

The graph of FIG. 1 illustrates:
at the curve $I_P$, the evolution of a first indicator corresponding to the capability indices Cpk calculated on a sliding sample of 10 parts, illustrating a short-term scale according to the criteria of the prior art (representing for example a week of production);
at the curve $I_M$, the evolution of a second indicator corresponding to the capability indices Cpk calculated on a sliding sample of 40 parts, illustrating a long-term scale according to the criteria of the prior art;
at the curve $I_P$, the evolution of a third indicator, called weighted indicator, corresponding to the capability indices Cpk calculated according to the values of average and weighted standard deviation, calculated by selecting parameters $\lambda=0.25$ and k=4, which ensures that, with weekly samplings of 10 parts, the aggregated sample will permanently have a constant size $N_t$ equal to 40 parts.

This graphic shows that the indicator illustrated by the curve $I_H$ is reactive, but since intervals of confidence on samples of ten parts are considerable, it does not satisfactorily characterise the population produced. Its volatility also does not easily uncover patterns in production monitoring. In fact, it tends to display variations in sampling (noise or oscillations) which impair the legibility of its evolution, or else tends to be jubilant in an upswing or too pessimistic in a downturn.

The indicator illustrated by the curve $I_M$ accumulates data of four weeks, which lets it display a sample size of 40 parts, considered as sufficient in this example for characterising production satisfactorily. But it is evident that it has inertia which makes it minimally reactive to rapid variations in production.

The weighted indicator illustrated by the curve $I_P$ also displays an aggregated sample size of 40 parts, which makes it sufficiently "voluminous" to let the manufacturer characterise production with a level of confidence deemed satisfactory. Also, this large size is not accompanied by inertia as detrimental as that of the second indicator illustrated by the curve $I_M$ in the face of rapid excesses. When examined, it simply uncovers upward or downward trends in production cycles.

It is therefore evident that the weighted indicator accumulates the advantages of both other preexisting indicators, without having any of their disadvantages.

It simplifies reading of indicators and regulating of production and makes it become more relevant, as well as best characterising the population of a given period.

As emerges from the description above, combined use of a calculation formula weighted for averages and for standard deviations, drawn from an analogy with the formulas for population mix, best responds to production monitoring needs for which both the average and also the standard deviation must be considered as variables.

The introduction of an intermediate weighting coefficient noted $\lambda^*$ takes into account the variable sizes of samples taken. The value of this intermediate weighting coefficient reflects exactly the weight of parts controlled during the preceding period in the overall aggregated sample.

Finally, the introduction of a cumulative coefficient, noted k, accumulates measured samples so that the size of the aggregated sample is greater than the average size of samples taken (in the way as when monitoring is performed over five successive weeks, the size of the sample is equal to five times the size of weekly sampling).

The proposed method can be performed in a manufacturing chain of parts, which can be fully or partially automated, where controls during production regulate the manufacturing flow, that is, adjust the manufacturing conditions to ensure that the finished parts continue to respond to the required quality criteria.

Figure 2:
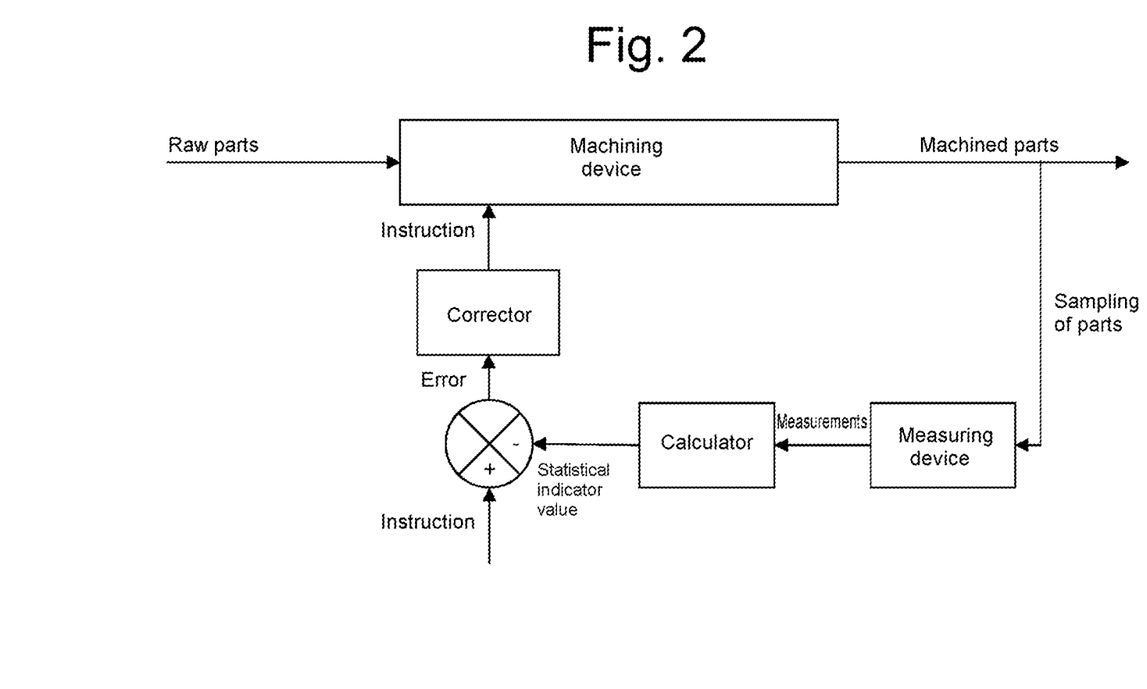
FIG. 2 is a diagram illustrating a production chain integrating control and regulating of production with sampling of parts.

FIG. 2 gives an example of such a manufacturing chain in which a machining device, such as for example a 5-axle machine, is used to make parts according to a specific instruction. The specific instruction can for example relate to a particular characteristic dimension. In place of the machining device, a manufacturing device not limited to the machining of parts could of course be used.

In this automated production chain, parts are sampled when exiting the machining device to form a sample and sent to a measuring device which measures one or more characteristic dimensions of each part of the sample taken.

Such a measuring device can for example be a three-dimensional measuring machine having sensors which automatically measure the preferred characteristic dimensions of each of the parts.

The measurement data coming from the measuring device are then sent to a calculation device which processes them to calculate one or more statistical indicators representative of one of the characteristic dimensions of the parts.

The calculated value of the statistical indicator is then compared to a reference instruction on the characteristic dimension in order to manage the manufacturing flow. More precisely, the results of this comparison optionally adjust the input parameters of the machining device.

If a deviation is evident, implying an error, for example if the value of the statistical indicator on the characteristic dimension is outside an acceptable range defined by the reference instruction, corrective measurements are determined by a corrector to adjust the input parameters of the machining device. The aim of modifications to the input parameters of the machining device is to correct the evident deviation so that the value of the statistical indicator on the characteristic dimension is back within an acceptable range.

The invention claimed is:

1. A method for manufacturing parts produced with a manufacturing device, based on an analysis of at least one statistical indicator representative of a characteristic dimension of parts, according to which:
   a) taking a plurality of samples over a period of time, each sample comprising a plurality of parts produced with the manufacturing device;
   b) measuring the characteristic dimension of each part of the plurality of samples;
   c) calculating a weighted average and a weighted standard deviation of the characteristic dimension for each sample taken,
      wherein calculating the weighted average and the weighted standard deviation comprises using an exponential weighting based on:
      an average and a standard deviation of the characteristic dimensions measured on parts of a sample taken at a present time t+1, and
      weighted averages and weighted standard deviations of the characteristic dimension calculated for samples taken at a previous time t; and
      wherein the weighted average and/or the weighted standard deviation of the characteristic dimension are weighted as a function of one or more of a number of parts in the plurality of samples, decentering data of the plurality of samples taken, and a time at which the plurality of samples are taken relative to each other;
   d) calculating a value of the statistical indicator from the calculated weighted average and the calculated weighted standard deviation for each sample taken;
   e) comparing the calculated value of the statistical indicator for the sample taken to a reference value so as to detect any deviation between the calculated value of the statistical indicator and the reference value; and
   f) regulating the manufacturing of parts as a function of the comparison by adjusting regulating parameters of the manufacturing device to optimise the deviation between the calculated value of the statistical indicator and the reference value.

2. The method as claimed in claim 1, wherein the number of parts contained in the plurality of samples is not constant, and wherein the weighted average and/or the weighted standard deviation of the characteristic dimensions are weighted as a function of the number of parts in the plurality of samples comprises calculating, for each sample taken at the present time t+1, a number of aggregated parts $N_{t+1}$ according to the formula:

$$N_{t+1} = \lambda n_{t+1} + (1-\lambda) N_c$$

where:
- $n_{t+1}$ is the number of parts contained in the sample taken at the present time t+1;
- $N_t$ is the number of aggregated parts of the sample at the previous time t;
- $\lambda$ is a weighting coefficient between 0 and 1.

3. The method as claimed in in claim 2, wherein the weighted average and/or the weighted standard deviation of the characteristic dimension are weighed as a function of the time at which the plurality of samples are taken relative to each other comprises calculating for each sample taken at the present time t+1 according to the formulas:

$$M_{t+1} = \lambda \mu_{t+1} + (1-\lambda) M_t$$

$$S_{t+1} = \sqrt{\lambda \sigma_{t+1}^2 + (1-\lambda) s_t^2 + \lambda(1-\lambda)(\mu_{t+1} - M_t)^2}$$

where:
- $\mu_{t+1}$ is the average of characteristic dimensions measured on the parts of the sample taken at the present time t+1;
- $M_t$ is the weighted average of the characteristic dimension calculated for the previous time t;
- $\sigma_{t+1}$ is the standard deviation of characteristic dimensions measured on the parts of the sample taken at the present time t+1;
- $S_t$ is the weighted standard deviation of the characteristic dimension calculated for the previous time t;
- $\lambda$ is a weighting coefficient between 0 and 1.

4. The method as claimed in claim 2, wherein the weighted average and/or the weighted standard deviation of the characteristic dimension are weighted as a function of the time at which the plurality of samples are taken relative to each other comprises calculating for each sample taken at the present time t+1 according to the formulas:

$$M_{t+1} = \lambda \mu_{t+1} + (1-\lambda) M_t$$

$$S_{t+1} = \sqrt{\lambda \sigma_{t+1}^2 + (1-\lambda) s_t^2 + \lambda(1-\lambda)(\mu_{t+1} - M_t)^2}$$

where:
- $\mu_{t+1}$ is the average of characteristic dimensions measured on the parts of the sample taken at the present time t+1;
- $M_t$ is the weighted average of the characteristic dimension calculated for the previous time t;
- $\sigma_{t+1}$ is the standard deviation of characteristic dimensions measured on the parts of the sample taken at the present time t+1;
- $S_t$ is the weighted standard deviation of the characteristic dimension calculated for the previous time t;
- $\lambda$ is a weighting coefficient between 0 and 1;
- $\lambda^*$ is an intermediate weighting coefficient defined by the formula:

$$\lambda^* = \frac{k \lambda n_{t+1}}{k \lambda n_{t+1} + (1-\lambda) N_t}.$$

5. The method as claimed in claim 2, wherein the weighted average and/or the weighted standard deviation of the characteristic dimension are weighted as a function of the time at which the plurality of samples are taken relative to each other comprises calculating for each sample taken at the present time t+1 according to the formulas:

$$M_{t+1} = \lambda \mu_{t+1} + (1-\lambda) M_t$$

$$S_{t+1} = \sqrt{\lambda \sigma_{t+1}^2 + (1-\lambda) s_t^2 + \lambda(1-\lambda)(\mu_{t+1} - M_t)^2}$$

where:
- $\mu_{t+1}$ is the average of characteristic dimensions measured on the parts of the sample taken at the present time t+1;
- $M_t$ is the weighted average of the characteristic dimension calculated for the previous time t;
- $\sigma_{t+1}$ is the standard deviation of characteristic dimensions measured on the parts of the sample taken at the present time t+1;
- $S_t$ is the weighted standard deviation of the characteristic dimension calculated for the previous time t;
- $\lambda$ is a weighting coefficient between 0 and 1;
- $\lambda^*$ is an intermediate weighting coefficient defined by the formula:

$$\lambda^2 = k \lambda n_{t+1} / k \lambda n_{t+1} + (1-\lambda) N_t.$$

6. The method as claimed in claim 1, wherein the number of parts contained in the plurality of samples is not constant, and wherein the weighted average and/or the weighted standard deviation of the characteristic dimensions are weighted as a function of the number of parts in the samples taken at the present time t+1 and at the previous time t comprises calculating, for each sample taken at the present time t+1, a number of aggregated parts $N_{t+1}$ according to the formula:

$$N_{t+2} = k \lambda n_{t+1} + (1-\lambda) N_t$$

where:
- $n_{t+1}$ is the number of parts contained in the sample taken at the present time t+1;
- $N_t$ is the number of aggregated parts of the sample at the previously time t;
- $\lambda$ is a weighting coefficient between 0 and 1;
- k is an aggregation coefficient determined greater than 1.

7. The method as claimed in claim 6, wherein the weighted average and/or the weighted standard deviation of the characteristic dimension are weighted as a function of the time at which the plurality of samples are taken relative to each other comprises calculating for each sample taken at the present time t+1 according to the formulas:

$$M_{t+1} = \lambda \mu_{t+1} + (1-\lambda) M_t$$

$$S_{t+1} = \sqrt{\lambda \sigma_{t+1}^2 + (1-\lambda) s_t^2 + \lambda(1-\lambda)(\mu_{t+1} - M_t)^2}$$

where:
- $\mu_{t+1}$ is the average of characteristic dimensions measured on the parts of the sample taken at the present time t+1;
- $M_t$ is the weighted average of the characteristic dimension calculated for the previous time t;
- $\sigma_{t+1}$ is the standard deviation of characteristic dimensions measured on the parts of the sample taken at the present time t+1;
- $S_t$ is the weighted standard deviation of the characteristic dimension calculated for the previous time t;
- $\lambda$ is a weighting coefficient between 0 and 1.

8. The method as claimed in claim 1, wherein the at least one statistical indicator is a capability index and/or a centering coefficient.

9. The method as claimed in claim 1, wherein the at least one statistical indicator is a capability index Cpk calculated according to the formula is selected as statistical indicator:

$$Cpk = \frac{\text{Min}(TS - M_{t+1};\ M_{t+1} - TI)}{3S_{t+1}}$$

where:
$M_{t+1}$ is the weighted average and $S_{t+1}$ the weighted standard deviation of the characteristic dimension of a sample at the present time t+1;
TS is an upper tolerance of the measured characteristic dimension;
TI is a lower tolerance of the measured characteristic dimension.

10. The method as claimed in claim 1, wherein the at least one statistical indicator is a capability index Cp calculated according to the formula is selected as statistical indicator:

$$Cp = \frac{(TS - TI)/2}{3S_{t+1}}$$

where:
$S_{t+1}$ is the weighted standard deviation of the characteristic dimension of a sample at the present time t+1;
TS is an upper tolerance of the measured characteristic dimension;
TI is a lower tolerance of the measured characteristic dimension.

11. The method as claimed in claim 1, wherein the at least one statistical indicator is a centering coefficient Cc calculated according to the formula is selected as a statistical indicator:

$$Cc = \frac{M_{t+1}}{(TS - TI)/2}$$

where:
$M_{t+1}$ is the weighted average of the characteristic dimension of a sample at the present time t+1;
TS is an upper tolerance of the measured characteristic dimension;
TI is a lower tolerance of the measured characteristic dimension.

12. A method for manufacturing parts produced with a manufacturing device, based on an analysis of at least one statistical indicator representative of a characteristic dimension of parts, according to which:

a) taking a plurality of samples over a period of time, each sample comprising a plurality of parts produced with the manufacturing device;
b) measuring the characteristic dimension of each part of the plurality of samples;
c) calculating a weighted average and a weighted standard deviation of the characteristic dimension for each sample taken,
   wherein calculating the weighted average and the weighted standard deviation comprises using an exponential weighting based on:
   an average and a standard deviation of the characteristic dimensions measured on parts of a sample taken at a present time t+1, and
   weighted averages and weighted standard deviations of the characteristic dimension calculated for samples taken at a previous time t; and
   wherein the weighted average and/or the weighted standard deviation of the characteristic dimension are weighted as a function of the time difference between the present time t+1 and the previous time t comprises calculating for each sample taken at the present time t+1 according to the formulas:

$$M_{t+1} = \lambda \mu_{t+1} + (1-\lambda) M_t$$

$$S_{t+1} = \sqrt{\lambda \sigma_{t+1}^2 + (1-\lambda) s_t^2 + \lambda(1-\lambda)(\mu_{t+1} - M_t)^2}$$

where:
$\mu_{t+1}$ is the average of characteristic dimensions measured on the parts of the sample taken at the present time t+1;
$M_t$ is the weighted average of the characteristic dimension calculated for the previous time t;
$\sigma_{t+1}$ is the standard deviation of characteristic dimensions measured on the parts of the sample taken at the present time t+1;
$S_t$ is the weighted standard deviation of the characteristic dimension calculated for the previous time t;
$\lambda$ is a weighting coefficient between 0 and 1;
d) calculating a value of the statistical indicator from the calculated weighted average and the calculated weighted standard deviation for each sample taken;
e) comparing the calculated value of the statistical indicator for the sample taken to a reference value so as to detect any deviation between the calculated value of the statistical indicator and the reference value; and
f) regulating the manufacturing of parts as a function of the comparison by adjusting regulating parameters of the manufacturing device to optimise the deviation between the calculated value of the statistical indicator and the reference value.

\* \* \* \* \*